United States Patent [19]

Watabe et al.

[11] Patent Number: 5,713,120
[45] Date of Patent: Feb. 3, 1998

[54] METHOD OF MANUFACTURING A BLADE FOR REGULATING THE THICKNESS OF A DEVELOPING AGENT

[75] Inventors: Masahiro Watabe; Noriyuki Yanai, both of Yokohama; Kentaro Niwano, Tokyo, all of Japan

[73] Assignee: Canon Kabushikia Kaisha, Tokyo, Japan

[21] Appl. No.: 511,224

[22] Filed: Aug. 4, 1995

Related U.S. Application Data

[62] Division of Ser. No. 201,129, Feb. 24, 1994, abandoned.

[30] Foreign Application Priority Data

Mar. 9, 1993 [JP] Japan .................. 5-072809

[51] Int. Cl.$^6$ .................................................. B21B 1/42
[52] U.S. Cl. .................................. 29/527.4; 264/311
[58] Field of Search ........................ 29/927.4, 882; 264/311

[56] References Cited

U.S. PATENT DOCUMENTS

| | | | |
|---|---|---|---|
| 3,700,764 | 10/1972 | Tago | 264/321 |
| 4,923,777 | 5/1990 | Imai et al. | 355/259 X |
| 4,939,551 | 7/1990 | Hashiyama et al. | 355/299 |
| 5,142,330 | 8/1992 | Hirano et al. | 355/259 |
| 5,170,213 | 12/1992 | Yamaguchi et al. | 355/259 X |
| 5,177,537 | 1/1993 | Okano et al. | 355/259 |
| 5,353,101 | 10/1994 | Adachi et al. | 29/882 X |
| 5,353,104 | 10/1994 | Kato et al. | |

FOREIGN PATENT DOCUMENTS

| | | |
|---|---|---|
| 0030574 | 2/1984 | Japan . |
| 0269181 | 11/1986 | Japan . |
| 0169609 | 7/1987 | Japan . |
| 0140786 | 5/1990 | Japan . |

*Primary Examiner*—Carl J. Arbes
*Attorney, Agent, or Firm*—Fitzpatrick, Cella, Harper & Scinto

[57] ABSTRACT

An elastic blade for press contacting a developing roller to regulate a thickness of a layer of developing agent conveyed by the developing roller to a developing area includes a springlike supporting plate, and a centrifugally molded rubber elastic layer coated on the supporting plate.

14 Claims, 3 Drawing Sheets

METHOD OF MANUFACTURING A BLADE FOR REGULATING THE THICKNESS OF A DEVELOPING AGENT

This application is a division of application Ser. No. 08/201,129 filed Feb. 24, 1994 now abandoned.

BACKGROUND OF THE INVENTION

The present invention relates to an elastic blade for regulating the thickness of a layer of developing agent for developing an electrostatic latent image, a developing device having such a blade, and a method of manufacturing the blade.

In a developing device shown in FIG. 1, a container 2 for accommodating a dry one-component developing agent (hereinafter referred to as a toner) 6 is provided with a developing roller 3. The developing roller 3 supports the developing agent thereon, and conveys it to a developing area D when rotated in a direction indicated by an arrow b. In the developing area D, the developing roller 3 opposes an electrophotographic photosensitive member i which can rotate in a direction indicated by an arrow a. In the developing area D, the developing roller 3 supplies the developing agent to the photosensitive member 1 to develop the electrostatic latent image on the photosensitive member 1.

When the toner is a non-magnetic one, it is desirable to provide an elastic roller 5 made of sponge rubber in the container in such a manner that it presses against the developing roller 3. The roller 5 rotates in the direction indicated by an arrow c to remove the toner remaining on the developing roller 3 therefrom after development and to provide a new coat of toner on the developing roller 3. However, roller 5 may be eliminated.

When the toner in a magnetic one, the developing roller 3 has a sleeve-like shape and contains therein a magnet.

The thickness of the layer of toner conveyed to the developing area D by the rotation of the developing roller 3 in the direction indicated by b is regulated by an elastic blade 4 pressed against the roller 3.

One end of the blade 4 is fixed to the container 2, and one side of a free end thereof presses against the roller 3.

The thickness of the layer of toner is regulated by a nip between the blade 4 and the roller 3. When the toner passes through that nip, it is rubbed against the roller 3 or the blade 4 and given a sufficient amount of electric charge having a polarity required to develop the electrostatic latent image.

The above-described elastic blade 4 is disclosed, for example, in GB2,006,054A. This prior art describes a blade made of rubber alone, a spring blade made of a metal or a synthetic resin alone and a composite blade in which a rubber layer is provided on a springlike supporting plate.

The composite blade is designed such that the rubber layer, which is disposed in contact with the developing roller, is pressed against the developing roller by the elastic force of the springlike supporting plate. Such a composite blade has advantages in that it can readily press against the developing roller uniformly in the longitudinal direction thereof, and in that it can readily maintain a predetermined pressing state over a long time.

The blade 4 shown in FIG. 1 is a composite blade in which a rubber layer 4b is joined to a springlike supporting plate 4a using an adhesive. The springlike supporting plate 4a of the blade 4 is fixed to the container 2, and the rubber layer 4b presses against the developing roller 3.

Since the grain size of the toner 6 ranges from several microns to several tens of microns, the following two factors are particularly essential in providing a thin layer or coating of toner 6 on the developing roller 3 in the development process employing the elastic blade 4.

First, the elastic blade 4 must be pressed against the surface of the developing roller 3 accurately and uniformly so that an electric charge can be uniformly given to the toner 6 held between the developing roller 3 and the elastic blade 4, and so that a uniform thin layer of toner 6 can be formed on the developing roller 3. Hence, an elastic blade 4 having an excellent flatness is required.

Secondly, the thin layer of toner 6 on the developing roller 3 must not have irregularities. Hence, an elastic blade 4 having a smooth surface is required.

The conventional composite blade is manufactured by joining a previously molded rubber piece to a supporting plate using an adhesive or by placing material rubber into a mold in which a supporting plate has been disposed beforehand and then by swaging the material rubber using a hot press.

However, the above-described adhesion method has a deficiency in that it is difficult for the rubber to adhere flatly. The hot press method has a disadvantage in that a molded article may be deformed due to an internal stress generated therein by a difference in the coefficient of thermal expansion between the metal and the rubber, and due to variations in the pressure during molding, and thus may have a deteriorated flatness.

Conventionally, it is therefore difficult to form a uniform layer of toner which can be electrically charged uniformly.

SUMMARY OF THE INVENTION

An object of the present invention is to provide an improved composite elastic blade for regulating the thickness of a layer of developing agent.

Another object of the present invention is to provide a developing device which enables a layer of toner having a uniform thickness to be readily formed.

Still another object of the present invention is to provide a developing device which enables a layer of developing agent which can be given a uniform electric charge by friction to be readily formed.

Still another object of the present invention is to provide a method of manufacturing a composite elastic blade which is capable of readily forming a uniform layer of developing agent.

Still another object of the present invention is to provide a method of manufacturing a composite elastic blade which is capable of readily forming a layer of developing agent which can be given a uniform electric charge by friction.

Other objects and features of the present invention will become apparent during the following discussion of the accompanying drawings.

DETAILED DESCRIPTION OF THE PREFERRED EMBODIMENTS

Figure 1:
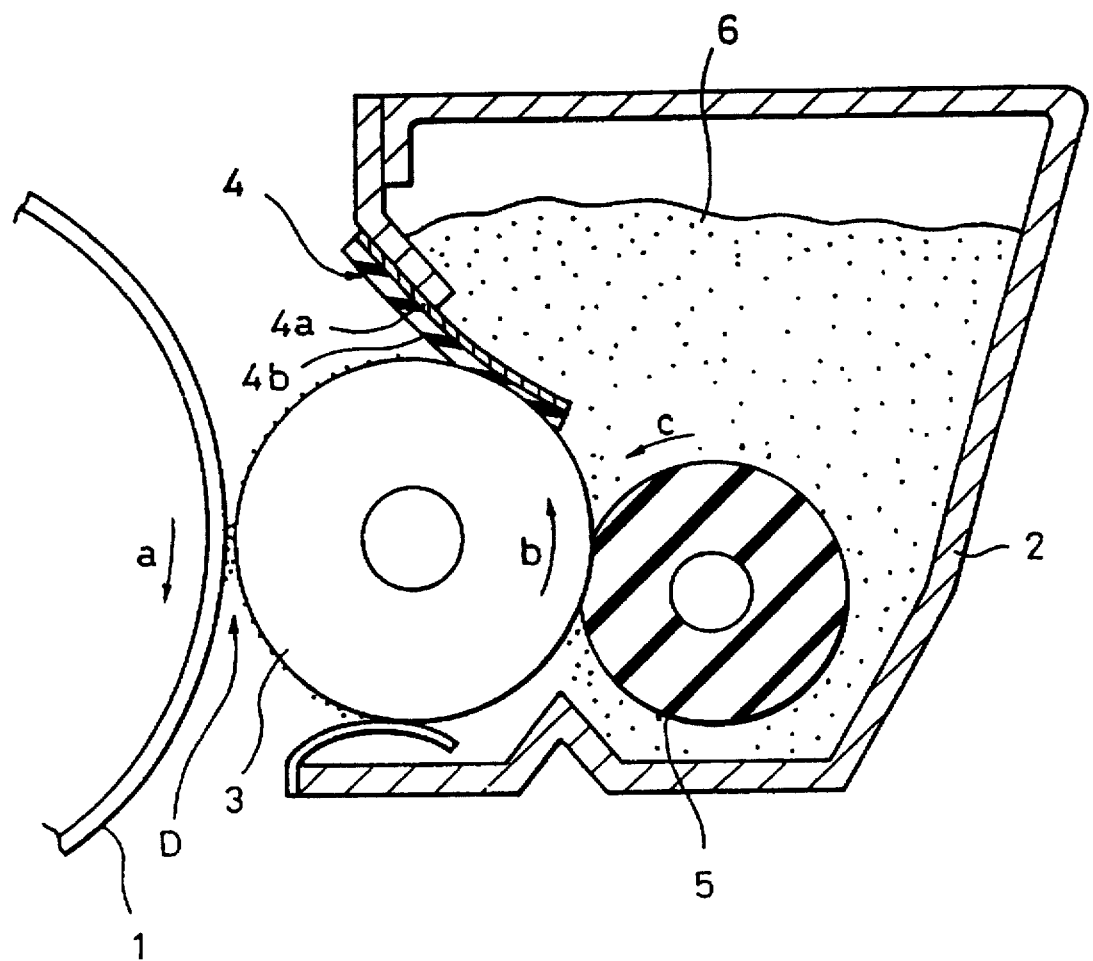
FIG. 1 illustrates a developing device of the present invention.

The composite elastic blade 4 shown in FIG. 1 is manufactured by coating the elastic layer 4b having rubber elasticity on an elastic flat plate (a springlike sheet) 4a made of a rigid material, such as a metal or a synthetic resin by the centrifugal molding method.

A metal spring sheet having a tensile strength of 30 kg/mm$^2$ or above conforming to JIS-Z2241/JIS-Z2201-5 or a synthetic resin spring sheet having a tensile strength of 10 kg/mm$^2$ or above conforming to JIS-C2318-72 can be used as the elastic flat plate, i.e., the elastic supporting plate 4a.

Thus, the supporting plate 4a may be a stainless steel plate (having a tensile strength of about 110 kg/mm$^2$), a phosphor bronze plate (having a tensile strength of about 65 kg/mm$^2$) or an aluminum plate (having a tensile strength of about 40 kg/mm$^2$). From the viewpoint of controlling the amount of pressure applied by the blade to the developing roller 3, a desired thickness of any of those metal plates is between 10 and 500 μm.

The supporting plate 4a may also be a springlike rigid elastic sheet made of a synthetic resin and having a thickness ranging from 50 μm to 100 μm, such as a polyethylene terephthalate plate (having a tensile strength of about 20 kg/mm$^2$), a polycarbonate plate (having a tensile strength of about 10 kg/mm$^2$) or a stretch polypropylene plate (having a tensile strength of about 19 kg/mm$^2$). Among the resin plates, plates made of biaxially oriented synthetic resins having reduced creep are particularly desirable.

The desirable material for the elastic layer 4b is a rubber which can easily give an electric charge to the toner by friction. Suitable examples of such a material include liquid urethane rubber, liquid nitrobutadiene rubber, liquid silicone rubber (which may be LTV or RTV), a modified article of any of such materials, and a blended article of any of such materials. Materials whose viscosity is adjusted by a solvent suffer from a problem involving evaporation of the solvent during molding. Therefore, a material having a viscosity of 10000 cP or less, preferably 5000 cP or less, at room temperature is desirable from the viewpoints of excellent flow properties and thickness accuracy. The desirable hardness of the elastic rubber is 85 degrees or less, according to the JISA hardness, and a desirable thickness thereof is between 0.1 and 2 mm.

The composite elastic blade 4 formed by combining the supporting plate 4a and the rubber elastic layer 4b is in abutment with the developing roller 3 in such a manner that part of the surface of the elastic blade 4 which opposes the roller 3 is in surface contact with the developing roller 3. The thickness of the supporting plate 4a, the thickness of the elastic layer 4b, the width and length of the elastic blade 4 and the positional relation between the elastic blade 4 and the developing roller 3 are determined such that the elastic blade 4 is in abutment with the developing roller 3 at a linear pressure ranging from 10 to 100 g/cm in the direction of the generant of the roller.

Next, the method of manufacturing the composite elastic blade 4 will be described.

In this manufacturing method, the supporting plate 4a is rolled up into a cylindrical form, and the rolled supporting plate 4a is fixed closely to the cylindrical inner surface of a centrifugal molding machine. Thereafter, liquid rubber is injected onto the inner surface of the cylindrical supporting plate, and the supporting plate and the liquid rubber are integrally molded by the centrifugal molding process. This manufacturing method has the following advantages:

First, since the liquid material stretches and hardens in a cylindrical form in the cylindrical mold in a liquid state utilizing a centrifugal force, the deformation of the elastic member can be reduced to an ignorable degree. Consequently, a blade made by cutting the cylindrical composite molded article has excellent flatness.

Secondly, in a conventional method for centrifugally molding a rubber plate using liquid rubber injected directly into the cylindrical mold, a parting agent must be coated on the inner surface of the cylindrical mold in order to prevent adhesion of the rubber to the cylindrical mold. Accordingly, the parting agent may be readily introduced into the molded article, or irregularities of the molded surface may be readily generated due to convection of the liquid rubber which occurs on the surface of the parting agent in a direction of the thickness of the rubber, which is different from the centrifugal direction of the cylindrical mold, thus deteriorating the surface roughness of the molded surface. However, in the above-described manufacturing method, since the rolled supporting plate is disposed on the inner surface of the cylindrical mold, the supporting plate serves as the molding surface of the rubber layer. Consequently, the surface of the rubber layer, which is not soiled by the parting agent, firmly adheres and has no irregularities, can be obtained. If a rolled or stretched supporting plate having a surface roughness obtained by mirror finish is employed, a molded article having a smaller surface roughness can be obtained. It is therefore possible to manufacture an elastic blade for regulating the amount of developing agent in which the surface of the elastic layer, which presses against the surface of the developing agent carrying member, has maximum roughness Rmax of 1 μm or less. It is also possible to manufacture a blade in which the surface of the elastic layer has a roughness Rmax of 0.5 μm or less.

During centrifugal molding, the rubber material may be set by heating. Further, the supporting plate may firmly adhere to the rubber elastic layer by providing a coating having an adhesive which adheres when heated, called a primer, on the supporting plate.

To fix the supporting plate to the cylindrical mold, the supporting plate sheet is rolled up into a cylindrical form, the joint of the rolled supporting plate is fixed using a jig, and the rolled supporting plate sheet is fixed to the cylindrical mold together with the jig. At that time, the outer surface of the rolled supporting plate is brought into close contact with the inner surface of the mold.

The sheet-like molded article in which the supporting plate and the elastic layer are integrally molded may be accurately cut into blades by a conventional shearing machine having a pair of upper and lower cutting blades.

Figure 2:
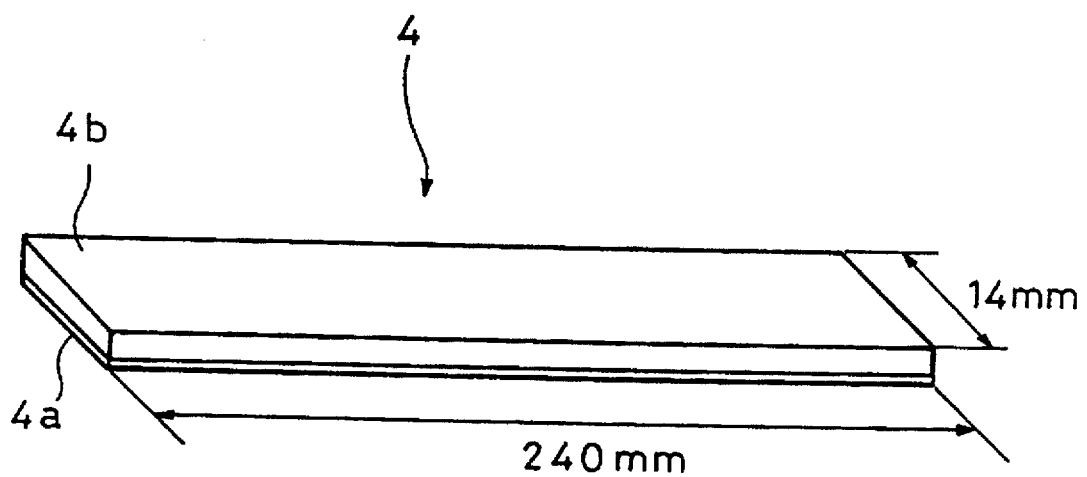
FIG. 2 is a perspective view of a composite elastic blade.
Figure 3:
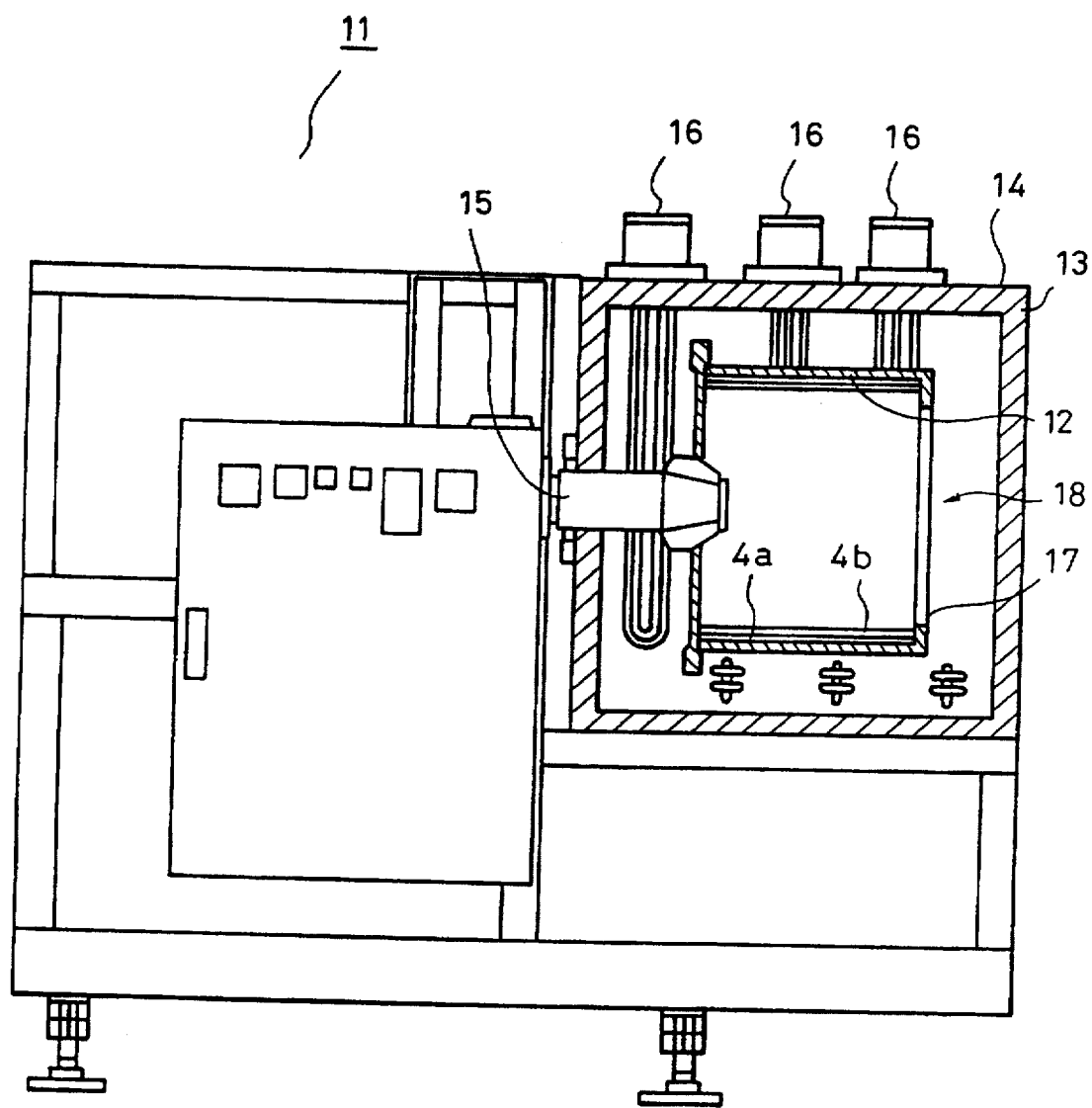
FIG. 3 illustrates a centrifugal molding machine.

Examples of the present invention will now be described.
Sample 1: manufactured by the method according to the present invention A sheet (4a) with a heat adhesion type adhesive coated thereon beforehand to attach the rubber layer thereto, which was rolled up into a cylindrical form to form the supporting plate 4a (made of a stainless steel SUS304-H, thickness: 60 μm, tensile strength: 110 kg/mm$^2$), was fixed closely to the cylindrical inner surface of a rotatable cylindrical mold 12 connected to a rotary driving shaft 15 of a centrifugal molding machine 11 shown in FIG. 3 using a cylindrical frame jig 17. Next, the mold 12 was rotated at a speed of 800 rpm while being heated to 100° C. by sheath heaters 16 disposed on a container 14 provided with an insulating material 13, during which time a liquid silicone rubber solution (TSE-3032 manufactured by Toshiba Silicone: 4000 cP), which was a mixture of two liquids, was injected onto the inner surface of the rolled sheet 4a from an end opening 18 of the mold 12 using a nozzle (not shown) to form the rubber layer 4b, and centrifugal molding was conducted for 20 minutes. At that time, the liquid rubber material (4b) uniformly stretched on the inner surface of the sheet (4a) and gradually hardened. Thereafter, the molded article (the composite sheet) in which the hardened layer (4b) adhered to the sheet (4a) was removed from the mold 12, the rolled sheet (4a) was unrolled in a flat plate-like form by rupturing it with a blade, and the flat plate-like sheet (4a) was heated at 200° C. for 4 hours. After being cooled, the sheet (4a) was cut into plates having a predetermined size shown in FIG. 2 with a conventional cutter.

Sample 2: manufactured by the method according to the present invention

A sheet for the supporting plate 4a (SUS304-H, thickness: 60 μm) with an adhesive coated thereon beforehand was fixed to the inner surface of the cylindrical mold 12 of the centrifugal molding machine using the cylindrical frame Jig 17. Next, the mold 12 was rotated at a speed of 800 rpm while being heated to 130° C., during which time a liquid urethane solution (an ethylene adipate type polyester manufactured by Nippon Polyurethane Kogyo, MDI prepolymer NCO 6.3%+a hardener, butanediol+TMP: 1700 cP/75° C.), which was a mixture of two liquids, was injected onto the sheet 4a and centrifugal molding was conducted for 20 minutes. Thereafter, the molded article in which the rubber material (4b) adhered to the sheet (4a) was removed from the mold 12, the rolled sheet (4a) was unrolled in a flat plate-like form, and the flat plate-like sheet (4a) was heated at 130° C. for 4 hours. After being cooled, the sheet (4a) was cut into plates having a predetermined size shown in FIG. 2 with a conventional cutter.

Sample 3: manufactured by the method according to the present invention

A sheet for the supporting plate 4a (biaxially oriented PET, thickness: 188 μm, tensile strength: 19 kg/mm$^2$)) with an adhesive coated thereon beforehand was fixed to the inner surface of the cylindrical mold 12 of the centrifugal molding machine using the cylindrical frame jig 17. Next, the mold 12 was rotated at a speed of 800 rpm while being heated to 130° C., during which time a liquid urethane solution (an ethylene adipate type polyester manufactured by Nippon polyurethane Kogyo, MDI prepolymer NCO 6.3%+a hardener, butanediol+TMP: 1700 cP/75° C.), which was a mixture of two liquids, was injected onto the sheet 4a and centrifugal molding was conducted for 20 minutes. Thereafter, the molded article in which the rubber material (4b) adhered to the sheet (4a) was removed from the mold 12, the rolled sheet (4a) was unrolled in a flat plate-like form, and the flat plate-like sheet (4a) was heated at 130° C. for 4 hours. After being cooled, the sheet (4a) was cut into plates having a predetermined size shown in FIG. 2 with a conventional cutter.

Sample 4: manufactured by a conventional method

A sheet for the supporting plate 4a (SUS304-H, thickness: 60 μm) with an adhesive coated thereon was mounted on a flat plate molding mold of a hot press molding machine, and a predetermined amount of high-temperature vulcanizing type millable silicone (SE4706U manufactured by Toray Dow Corning Silicone) with a peroxide hardener kneaded therein was placed in the mold. In that state, molding was conducted at 160° C. for 30 minutes. After the molded article was removed from the mold, it was heated at 200° C. for 4 hours. After being cooled, the molded article was cut into flat plates having a predetermined size shown in FIG. 2 with a conventional cutter.

Sample 5: manufactured by a conventional method

A silicone type parting agent was coated on the inner surface of the cylindrical mold 12 of the centrifugal molding machine, and the mold 12 was rotated at a speed of 800 rpm while being heated to 130° C., during which time a liquid urethane solution (an ethylene adipate type polyester manufactured by Nippon polyurethane Kogyo, MDI prepolymer NCO 6.3%+a hardener, butanediol+TMP), which was a mixture of two liquids, was injected into the cylindrical mold 12 and centrifugal molding was conducted for 20 minutes. Thereafter, the molded article was removed from the mold 12, the rolled article was unrolled in a flat plate-like form, and the flat plate-like article was heated at 130° C. for 4 hours. After being cooled, the article was cut into plates having a predetermined size shown in FIG. 2 with a conventional cutter.

Next, the supporting plate 4a (SUS304-H, thickness: 60 μm) with ah adhesive coated thereon beforehand and the urethane sheet obtained by centrifugal molding and cut into predetermined sizes were placed in the adhering jig in a state where the supporting plate 4a was closely attached to the inner surface of the urethane sheet (the surface of the urethane sheet which did not contact the cylindrical mold). The jig was pressurized for 1 minute by a hot press heated to 150° C. Thereafter, the adhering article was removed from the jig. After being cooled, the adhering article was cut into predetermined sizes.

Table 1 lists the performance of the thus-manufactured elastic blade members.

|  | Sample 1 | Sample 2 | Sample 3 | Sample 4 | Sample 5 |
|---|---|---|---|---|---|
| Material of the supporting plate 4a | SUS | SUS | PET | SUS | SUS |
| Thickness of the supporting plate 4a (μm) | 60 | 60 | 188 | 60 | 60 |
| Material of the elastic layer 4b | LTV | Liquid urethane | Liquid urethane | HTV | Liquid urethane |
| Hardness of the elastic layer 4b JIS A | 35 | 65 | 65 | 60 | 65 |
| Thickness of the elastic layer 4b (mm) | 0.4 | 0.4 | 0.4 | 0.4 | 0.4 |
| Flatness (mm) | 0.05 | 0.06 | 0.08 | 0.55 | 0.48 |
| Surface roughness (μm) | 0.4 | 0.4 | 0.5 | 2 | 1 |
| Crater-like pattern on the surface | None | None | None | Present | Present |

Note 1 Flatness: the maximum value with which one lateral end of the elastic blade was separated from the surface plate when the elastic blade placed on the surface plate with the supporting plate in contact with the surface plate was uniformly pressed at a width of 5 mm from the other lateral end thereof over the entire length of 240 mm.

Note 2 Surface roughness: measured by the single probe surface roughness tester (Handy Surf E30A, manufactured by Tokyo Seimitsu)

As will be clear from Table 1, Samples 1 through 3 are excellent in terms of flatness, surface roughness and absence of surface patterns, as compared with Samples 4 and 5.

When a layer of developing agent whose thickness is regulated by the elastic blade according to the present invention is used, a high-density developed image having no fog can be readily obtained.

What is claimed is:

1. A method of manufacturing a blade for press contacting a developing agent carrying member, and for regulating a thickness of a layer of a developing agent conveyed by the developing agent carrying member, said method comprising the steps of:

disposing a cylindrically rolled up springlike sheet in rotatable molding means having a cylindrical inner peripheral surface, such that an outer surface of said cylindrically rolled up springlike sheet is closely attached to the cylindrical inner peripheral surface of said molding means;

injecting a liquid rubber material onto an inner surface of said cylindrically rolled up springlike sheet disposed in said molding means;

rotating said rotatable molding means to form a coating of said liquid rubber material on said inner surface of said cylindrically rolled up springlike sheet, thereby to form a composite sheet having a layer of hardened rubber material on said cylindrically rolled up springlike sheet;

removing the composite sheet from the molding means; and cutting said composite sheet into blades.

2. The method according to claim 1, further comprising the step of providing an adhesive for joining said cylindrically rolled up springlike sheet to said layer of hardened rubber by coating said adhesive on said cylindrical rolled up springlike sheet before said liquid rubber material is injected thereonto.

3. The method according to claim 2, further comprising the step of heating said molding means.

4. The method according to claim 3, further comprising the step of heating said composite sheet after the step of removing the composite sheet from said molding means and prior to the step of cutting the composite sheet into blades.

5. A method of manufacturing an elastic blade, which is mounted in an apparatus and urged against a developer carrying member for regulating a thickness of a layer of a developer coated on said developer carrying member, comprising the steps of:

disposing a flexible sheet in a mold;

injecting a liquid rubber material in the mold; and coating the flexible sheet with a rubber layer by centrifugal molding.

6. A method according to claim 5, wherein the disposing step includes arranging the flexible sheet in contact with an interior wall of the mold.

7. A method according to claim 5, further comprising the steps of:

removing a composite sheet including the rubber layer on said flexible sheet from the mold; and cutting the composite sheet to format least one elastic blade.

8. A method according to claim 5, further comprising the step of coating the flexible sheet with an adhesive material, for adhering the rubber layer to the flexible sheet, before the liquid rubber material is injected into the mold.

9. A method according to claim 5, further comprising the step of forming the flexible sheet of metal.

10. A method according to claim 9, wherein said forming step includes forming the flexible sheet with a thickness of 20–500 µm.

11. A method according to claim 5, wherein said coating step includes forming the rubber layer with a roughness of Rmax 1 µm or lower.

12. A method according to claim 5, wherein said coating step includes forming the rubber layer with a JIS A hardness of 85 degree or lower.

13. A method according to claim 5, wherein said coating step includes forming the rubber layer with a thickness of 0.1–2 mm.

14. A method of manufacturing an elastic blade for a developing apparatus, comprising the steps of:

disposing a flexible sheet in a mold;

injecting a liquid rubber material in the mold; and applying an adhesive material to the flexible sheet, for adhering the liquid rubber material to the flexible sheet, before the liquid rubber material is injected into the mold;

coating the flexible sheet with the liquid rubber material by centrifugal molding.

* * * * *

UNITED STATES PATENT AND TRADEMARK OFFICE
CERTIFICATE OF CORRECTION

PATENT NO. : 5,713,120
DATED : February 3, 1998
INVENTOR(S) : Watabe et al.

Page 1 of 2

It is certified that error appears in the above-identified patent and that said Letters Patent is hereby corrected as shown below:

COLUMN 1:

Line 21, "member i" should read --member 1--;
Line 30, "the" (first occurrence) should be deleted;
Line 34, "in" should read --is--; and
Line 37, "the" (first occurrence) should be deleted.

COLUMN 4:

Line 20, "irregularities, can be" should read --irregularities--;
Line 21, "obtained." should be deleted; and
Line 27, "has" should read --has a--.

COLUMN 5:

Line 16, "Jig" should read --jig--.

UNITED STATES PATENT AND TRADEMARK OFFICE
CERTIFICATE OF CORRECTION

PATENT NO. : 5,713,120
DATED : February 3, 1998
INVENTOR(S) : Watabe et al.

It is certified that error appears in the above-identified patent and that said Letters Patent is hereby corrected as shown below:

COLUMN 6:

Line 15, "oh" should read --an--.

COLUMN 8:

Line 37, "mold; and" should read --mold;--; and
   Line 41, "mold;" should read --mold; and--.

Signed and Sealed this

Thirteenth Day of February, 2001

Attest:

Attesting Officer

NICHOLAS P. GODICI

Acting Director of the United States Patent and Trademark Office

UNITED STATES PATENT AND TRADEMARK OFFICE
CERTIFICATE OF CORRECTION

PATENT NO.    : 5,713,120
DATED         : February 3, 1998
INVENTOR(S)   : Watabe et al.

It is certified that error appears in the above-identified patent and that said Letters Patent is hereby corrected as shown below:

Title page,
Item [73], Assignee, "Canon Kabushikia Kaisha" should read -- Canon Kabushiki Kaisha --.

Signed and Sealed this

Twenty-second Day of April, 2003

JAMES E. ROGAN
*Director of the United States Patent and Trademark Office*